United States Patent
Numrich

[19]

[11] Patent Number: 5,964,045

[45] Date of Patent: Oct. 12, 1999

[54] METHOD AND APPARATUS FOR THE PURIFICATION OF OIL-CONTAINING AND WATER-CONTAINING ROLL SCALE SLUDGE

[75] Inventor: Reiner Numrich, Borchen, Germany

[73] Assignee: Gebrüder Lödige Maschinenbau GmbH, Paderborn, Germany

[21] Appl. No.: 09/047,211

[22] Filed: Mar. 25, 1998

[30] Foreign Application Priority Data

Apr. 16, 1997 [DE] Germany .............................. 197 15 839

[51] Int. Cl.⁶ ..................................................... F26B 5/04
[52] U.S. Cl. ............................................... 34/408; 34/425
[58] Field of Search ............................. 34/408, 424, 425, 34/60, 73, 77, 86, 92, 182, 183; 210/631, 762, 770; 203/41, 50, 91

[56] References Cited

U.S. PATENT DOCUMENTS

| | | | |
|---|---|---|---|
| 3,811,200 | 5/1974 | Hager ......................................... | 34/337 |
| 3,931,012 | 1/1976 | Huse ........................................ | 210/152 |
| 4,911,930 | 3/1990 | Gergely et al. ........................... | 424/466 |
| 5,122,233 | 6/1992 | Zampieri .................................. | 34/60 X |
| 5,263,263 | 11/1993 | Gheorghiu et al. ........................ | 34/250 |
| 5,490,907 | 2/1996 | Weinwurm et al. ....................... | 203/29 |

FOREIGN PATENT DOCUMENTS 2918820  11/1980  Germany .

OTHER PUBLICATIONS

"Thermocon–Thermische Reinigung von kontaminierten Schüttgüttern" (Thermocon–Thermal Purification of Contaminated Bulk Products) company brochure of Lobbe Umwelttechnik GmbH & Co., Iserlohn, Germany, Jun. 1996.

*Primary Examiner*—Henry Bennett
*Assistant Examiner*—Steve Gravini
*Attorney, Agent, or Firm*—Paul Vincent

[57] ABSTRACT

In a method for the cleaning of oil- and water-containing roll scale sludge, the roll scale sludge is introduced to a heatable treatment region 10 for a first drying step. In addition to the first drying step, a second drying step is provided for with which the roll scale sludge is subjected to a vacuum drying 14, 15. For this reason, the purification of the oil- and water-containing roll scale sludge is improved without additional auxiliary materials using only pure thermal energy in an effective manner which is applicable to large-scale commercial applications.

6 Claims, 1 Drawing Sheet

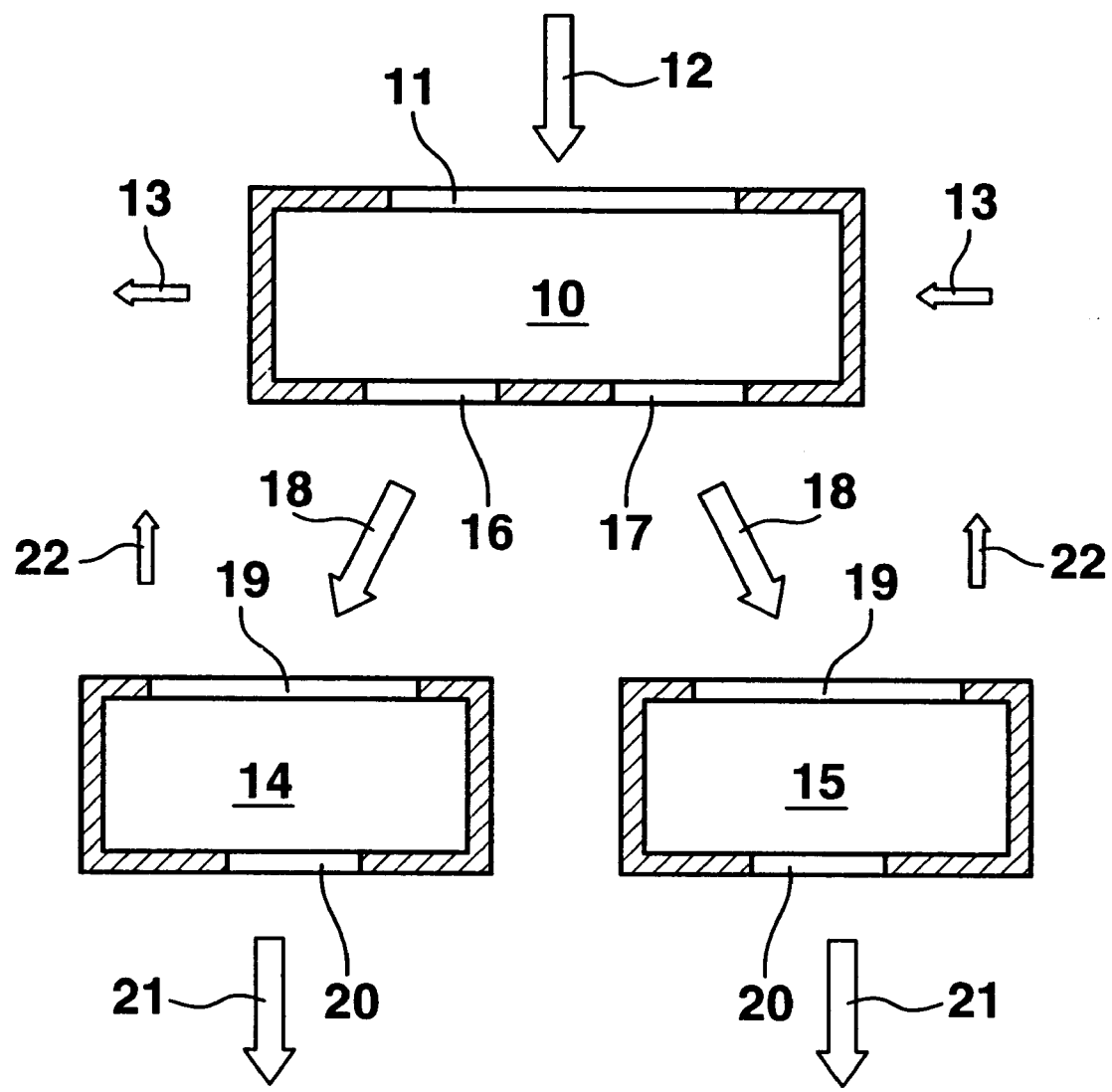

METHOD AND APPARATUS FOR THE PURIFICATION OF OIL-CONTAINING AND WATER-CONTAINING ROLL SCALE SLUDGE

This application claims Paris Convention Priority of German patent application number 197 15 839.0 filed Apr. 16, 1997 the complete disclosure of which is hereby incorporated by reference.

BACKGROUND OF THE INVENTION

The invention concerns a method, and a device for carrying out the method, for purifying oil-containing and watercontaining roll scale sludge with which the roll scale sludge is introduced to a heatable treatment region in a first drying step.

A method and a device of the above mentioned kind are known in the art from the brochure "Thermocon-Thermische Reinigung von kontaminierten Schüttgütern" [Thermocon, Thermal Purification of Contaminated Bulk Products] published by Lobbe Umwelttechnik GmbH & Co, D-58642 Iserlohn, 6/1996.

In steel-processing industry, initial raw steel product is processed into an intermediate or end product via shaping processes (rolling, forging, etc.). During processing, in addition to the intermediate or end product, waste products in the form of iron-containing particles (iron powder, iron chips and the like) also occur. Due to the action of oxidizing gases on these waste products, an iron oxide, which is called roll scale, is rapidly produced. A recycling method has the goal of returning this roll scale into a usable initial product. This is, however, made difficult by the fact that the roll scale is contaminated, via lost lubricant or leakage from the processing installation, with oils, fats and other liquids. As a result, this soiled roll scale, designated as roll scale sludge, is no longer suitable as a raw material for recycling into the production of steel. The roll scale sludge can then only be integrated into the raw material cycle for steel production if the oil and water can be removed. The need to purify oil- and water-containing roll scale sludge is obvious in view of the fact that, alone in the Federal Republic of Germany, approximately one million tons of contaminated high quality roll scale is produced per year in the steel processing industry. For environmental reasons it is therefore important to separate water and oil from the roll scale in order to be able to reuse the extracted iron oxide in high-temperature furnaces for the production of steel.

The above mentioned Lobbe brochure has already proposed a method with which the roll scale sludge is heated in a bulk product container. The bulk product container comprises a reactor in which the roll scale sludge is heated from below so that the contained water initially evaporates and rises. The organic contaminants (oils, fats) are thereby also intended to be driven out of the roll scale sludge. The resulting exhaust vapors can be removed and purified from the upper region of the bulk product container. This type of treatment of soiled sludge is primarily suitable for sludges having a high percentage of water. If, however, the fractions of oil and fat in the contaminated sludge increase, the purification loses its effectivity or the processing time of the sludge continuously increases. In particular, the desired treatment of large quantities of oil- and water-containing roll scale sludge in as short a processing time as possible is not feasible.

The conventional process works on a pure thermal basis. DE 29 18 820 C2 therefore additionally proposes the admixture of chemical reactants during the cleaning of the bulk and/or flowing materials in order that the reactants act on the bulk material. This type of utilization of additional reacting products requires additional processing steps and is associated with additional recycling problems such as disposal of the reaction products. Downstream filters, washers or condensers are required for recapturing the reactants.

Although it is desirable to be able to purify the oil- and water-containing roll scale sludge based on thermal processes alone, the conventional useful large scale commercial industrial methods incorporate auxiliary materials (hydrophobyrized calcium, steam as stripping agent and the like) to separate the oil. The waste products which thereby result must likewise be disposed of and are difficult to recycle.

It is therefore the purpose of the present invention to improve purification of oil- and water-containing roll scale sludge without additional auxiliary materials utilizing only thermal energy and in a more effective fashion suitable for large-scale commercial applications.

SUMMARY OF THE INVENTION

This purpose is achieved by a device for carrying out the method in accordance with the invention and by means of the method itself which, in addition to the first drying step, proposes a second drying step with which the roll scale sludge is subjected to a vacuum drying.

In a first drying step, the evaporation of water at atmospheric pressure is effected by the input of heat. For this reason the processing region for the first drying step must only be heated up to a temperature with which the water in the roll scale sludge evaporates. The hot water vapor is then removed from the processing region, cleaned and made available for other applications.

Subsequently, the roll scale sludge from which the water has been eliminated is processed further by means of vacuum drying. This gentle drying is advantageous since undesired oxidative changes in the iron oxide can thereby be avoided. To effect heating during vacuum drying, the heat is transferred by means of contact or through heat irradiation. vacuum drying of the roll scale sludge is advantageously carried out at a pressure of 5 to 10 mbar.

The cooperation between the conventional drying and a vacuum drying thereby allows the oil- and water-containing roll scale sludge to be more effectively cleaned. In a first step, the water is removed from the roll scale sludge so that the temperature regions in the first drying step can be adjusted to remove water from the roll scale sludge, whereas the second step targets removal of oils and fats from the roll scale sludge.

In a preferred embodiment, the first drying step is carried out in a rotory tubular kiln. This type of rotory tubular kiln has a plurality of applications and has already been used in iron and steel production. It is therefore already available to the steel industry companies. The rotory tubular kiln consists essentially of a heatable fire-resistant pipe made from steel sheet metal. The pipe is tilted by several degrees relative to the horizontal so that the product located in the pipe wanders during the slow rotation of the rotory tubular kiln from the upper end of the rotory tubular kiln towards the bottom. The heating of the roll scale sludge is effected by means of direct contact with the heated tube and/or with a heated gas which flows through the rotory tubular kiln either in a parallel or counter-flow sense. By tilting and changing the rotational speed, one can prevent the roll scale sludge from baking onto the fire-resistant tube.

A good heat transfer within the processing region to the roll scale sludge can be effected if a hot gas is introduced to the roll scale sludge in the treatment region. The introduced hot gas has a temperature of preferentially 250° C. and can flow through the roll scale sludge in direct contact and lightly shake same to drive out the water. The hot gas can reach as large a surface area inside of the roll scale sludge as possible to accelerate the drying step.

Commercial use of the method in accordance with the invention can be improved even further if the first drying step is carrying out continuously in the treatment region, whereas the second drying step is carried out in a discontinuous fashion with the assistance of at least two vacuum drying devices. The treatment region for the first drying step is always heated and is supplied in continuous operation with roll scale sludge. Water is driven out of the roll scale sludge without stopping operation and without interruption. Two or more vacuum drying devices are available for the second drying step. After completion of the second drying step in one of the two vacuum drying devices, this vacuum drying device is emptied, while the other second vacuum drying device can be filled for a renewed drying step. This facilitates, in a quasi-continuation operation of the over-all installation, an economical processing of large quantities of roll scale sludge. Both the treatment of contaminated roll scale sludge as well as the removal of purified roll scale sludge from the installation can be carried out simultaneously.

It is advantageous to sequentially clean the roll scale sludge with regard to water and to oil. For this reason, the second drying step is carried out at a higher temperature than the first drying step. Although it is sufficient to heat up the treatment region to a temperature sufficient for the evaporation of water, the purification of the roll scale sludge from oil is preferentially carried out at a temperature of about 300° C.

The energy balance of the method in accordance with the invention is positively influenced if the energy of the exhaust gas and/or the purified roll scale sludge occurring after the second drying step is utilized for warming-up the treatment region for the first drying step. The processing of the roll scale sludge within the vacuum drying device at a higher temperature than in the treatment region causes the products removed from the vacuum drying device to have a temperature which is precisely sufficient for heating-up the processing treatment region for the first drying step. This energy can be once more integrated into the processing cycle. Utilization of the heat energy of the product leaving the vacuum drying can be effected using heat exchangers or similar devices.

The required amount of energy to heat the vacuum drying device up to the required high temperatures can, for example, be generated using a conventional oil-burning installation. The wall of the vacuum dryer can normally be heated by warmed thermal-oil and/or electrically.

In order to carry out the method, a device is additionally proposed having a directly heatable treatment region for a first drying step and a device for vacuum drying for a second drying step. The first treatment region as well as the vacuum drying device can be compactly accommodated in a frame having standardized outer dimensions. In addition thereto, switching devices and conventional operation elements such as gas-tight seals, butterfly valves, gate valves or the like can be provided for.

Integration of a rotory tubular kiln into the device for carrying out the first drying step is furthermore preferred. Use of a rotory tubular kiln has the advantages already mentioned.

In a preferred embodiment, the device has at least two discontinuously functioning vacuum dryers for carrying out the second drying step. With the assistance of these vacuum dryers, the upstream rotory tubular kiln can be operated continuously and the material freed from $H_2O$ flowing out of the rotory tubular kiln can be introduced to one of the two vacuum dryers. The other vacuum dryer removes oils and fats from the roll scale being processed and, after completion of the vacuum drying, this vacuum dryer is emptied. The roll scale flowing out of the vacuum stage is freed from impurities and can be further processed without loss of quality. After the second vacuum dryer is emptied, the product streaming out of the rotory tubular kiln is redirected into the second vacuum dryer and the vacuum drying can begin in the first vacuum dryer.

It is advantageous to equip the vacuum dryer with mixing and/or processing elements (preferentially plough-share blade elements) which move the product to be dried in a bulk fashion and/or in a mechanically generated fluid bed.

This has the advantage that the product to be dried can be freed from bonding oil and/or fats within a short period of time. The product to be processed is completely turned over under vacuum in the processing region or is moved in such a fashion that no product clumps can occur which would only be subject to a limited amount of vacuum drying (dead spaces).

Clearly, the method in accordance with the invention can be exclusively used with a plurality of continuously operating or quasi-continuously operating vacuum dryers so that vacuum dryers can also be utilized in the first drying step (to drive-out $H_2O$).

Further advantages can be derived from the accompanying drawing. The above mentioned features and those to be further described below can be utilized in accordance with the invention individually or collectively in arbitrary combination. The embodiments mentioned are not to be considered exhaustive enumeration, rather have exemplary character only.

The invention is shown in the drawing and will be more closely explained with reference to an embodiment.

BRIEF DESCRIPTION OF THE DRAWING

The FIGURE shows a diagram of the device in accordance with the invention.

DESCRIPTION OF THE PREFERRED EMBODIMENT

The device also illustrates a method in accordance with the invention in a highly-schematic manner reduced to the essential features of the invention.

A treatment region 10 can be supplied with oil- and water-containing roll scale sludge. The treatment region 10 can be charged with roll scale sludge through a closable opening 11 from the upward direction in the direction of arrow 12. Conventional standard types of reaction and drying devices can be used to carry out the procedure. Gas-tight sealing devices, pipe conduits, heating elements, controlling devices and the like must therefore not be more closely described here. The treatment region 10 can be part of a rotory tubular kiln or another heatable device (for example a vacuum dryer). The treatment region 10 is preferentially imperviated by hot gas 13. The roll scale sludge located within the treatment region 10 is heated up by the hot gas 13 at atmospheric pressure to a temperature of up to 80° C. In addition, the roll scale sludge is also heated up by direct contact with the inner walls of the preferred rotory tubular kiln. The water inside of the roll scale sludge thereby evaporates and can be exhausted in the form of water vapor. The exhausted water vapor is subsequently cleaned by a filter system and led off.

Roll scale sludge is preferentially continuously heated up within the treatment region 10 and thereby freed from water. The water-dried roll scale sludge can always be removed into one of the two vacuum drying devices 14 and 15 shown in the FIGURE. The treatment region 10 has openings 16 and 17 on its lower side by means of which the water-dried roll scale sludge can gain entrance in the direction of arrow 18 via the openings 19 into the vacuum drying devices 14 and 15. The openings 16, 17 and 19 are, like the removal openings 20, closable by means of suitable elements (butterfly valves, gate valves, locks) and, if required, controllable.

The vacuum drying devices 14 and 15 are preferentially operated at a pressure between 5 to 10 mbar and a temperature of up to 300° C. These types of conditions facilitate the removal of oil from the roll scale sludge. Organic contaminants are driven out, led-off and cleaned. Even aromatic hydro-carbon materials which are not easily volatilized can thereby be removed from the roll scale sludge. The roll scale sludge can subsequently be removed from processing in the direction of arrow 21 and reused for the production of steel. The hot gases 22 produced inside the vacuum drying devices 14 and 15 can be advantageously used to heat-up the hot gases 13 for the heating of the treatment region 10 via heat exchangers. The energy of the dried roll scale sludge can also advantageously be integrated into the processing cycle so that it can give up its energy to the hot gases 13 by means of appropriate auxiliary devices and heat exchangers In a method for the cleaning of oil- and water-containing roll scale sludge, the roll scale sludge is introduced to a heatable treatment region 10 for a first drying step. In addition to the first drying step, a second drying step is provided for with which the roll scale sludge is subjected to a vacuum drying 14, 15. For this reason, the purification of the oil- and water-containing roll scale sludge is improved and rendered more effective without additional auxiliary materials using thermal energy only in a manner which can be used for large-scale commercial applications.

In addition, the method in accordance with the invention can be an ideal supplement for existing production installations in the steel processing industry taking into the consideration recycling.

I claim:

1. A method for removing oil and water from roll scale sludge comprising the steps:

a) drying the roll scale sludge in a heatable treatment region; and b) vacuum drying the roll scale sludge following step a).

2. The method of claim 1, wherein said treatment region of step a) comprises a rotory tubular kiln.

3. The method of claim 1, wherein step a) comprises the step of a1) introducing hot gas into the roll scale sludge.

4. The method of claim 1, wherein step a) is carried out continuously in said treatment region, and step b) comprises the step of b1) vacuum drying the roll scale sludge in one of a first and a second vacuum drying device in a discontinuous fashion.

5. The method of claim 1, wherein step b) is carried out at a higher temperature than step a).

6. The method of claim 1, further comprising the step of c) heating said treatment region using exhaust gas energy produced in step b).

* * * * *